Aug. 30, 1927.

J. E. TURRELL ET AL 1,640,863

DUST CAP FOR TIRE VALVES

Filed June 21, 1926

Inventor:
James E. Turrell,
William G. Thomas,
by Spear Middleton Donaldson & Hall
Attys.

Patented Aug. 30, 1927.

1,640,863

UNITED STATES PATENT OFFICE.

JAMES ELMORE TURRELL, OF NOXEN, AND WILLIAM G. THOMAS, OF WEST PITTSTON, PENNSYLVANIA.

DUST CAP FOR TIRE VALVES.

Application filed June 21, 1926. Serial No. 117,472.

This invention relates to improvements in dust caps for tire valves.

It is an object of the invention to provide a device of this character which is simple in construction and which may readily be applied to secure an effective cover for a valve, and one which can be readily removed, but free from liability of accidental detachment.

The invention consists in the features, combination and arrangement of parts herein described and particularly pointed out in the claim.

With reference to the accompanying drawings.

Figure 1:
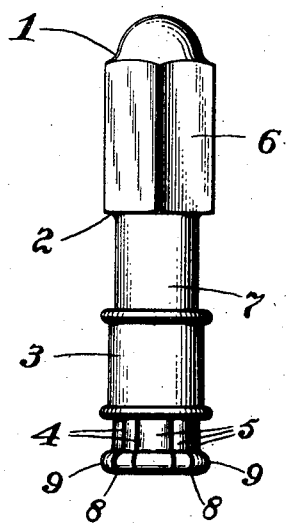
Fig. 1 is a view of the complete valve cap.

In the drawings, the numeral 1 represents the valve cap in its entirety, which may be of brass or other spring material and which is of the ususal tubular form closed at its upper end and provided with an upper grip portion 6 and a lower valve tube engaging portion 7 which is smaller in diameter than the portion 6, whereby a shoulder is formed at 2 where the portions 6 and 7 join.

Figure 2:
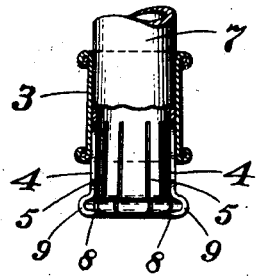
Fig. 2 is a sectional detail view of the thread engaging end of the cap.

A sleeve 3 is slidably mounted on the portion 7 and is limited in upward movement by the shoulder 2. The lower end of the valve tube engaging portion 7 is slotted as shown at 4 so that individual spring sections 5 are formed which tend to spring outwardly diametrically of the tube, thus increasing its effective circumference. The lower ends of the sections 5 are hooked as shown in Fig. 2 to provide thread engaging projections 8 and humped portions 9, which portions 9 serve to limit downward movement of the sleeve 3. The sleeve 3 is adapted to be pushed downwardly over the slotted portion 4 to contract the sections 5 until the projections 8 engage the threads of the valve.

In operation, to apply the cap it is slipped down over the valve tube, the sleeve 3 is moved down over the slotted portion 4 until it abuts against the portions 9 of the sections 5, thus forcing the projections 8 into contact with the threads on the tire valve tube and locking the cap in position.

In removing the cap the sleeve 3 is moved up to shoulder 2, allowing the sections 5 with their projections 8 to spring away from the threads on the tire valve tube, releasing the cap, which can then be removed.

We claim:

A dust cap for tire valves or the like comprising a tube closed at one end and open at the other to receive a valve stem, a sleeve slidably mounted on said tube, said tube at its open end being longitudinally slotted to form individual spring sections integral with the tube which tend to spring outwardly, said spring sections being of uniform thickness throughout, the lower end of each spring section being bent to form an outwardly projecting bead which terminates in an inwardly extending edge extremity which projects inwardly beyond the inner face of the section to engage the threads of the valve stem, upon downward movement of said sleeve over the spring sections, forcing them inwardly, said edge extremities of the spring sections all being disposed in the same plane at right angles to the axis of the dust cap.

In testimony whereof we affix our signatures.

JAMES ELMORE TURRELL.
WILLIAM G. THOMAS.